Jan. 19, 1932.     G. B. WATKINS     1,841,689
LAMINATED GLASS AND APPARATUS FOR PRODUCING THE SAME
Filed May 28, 1928
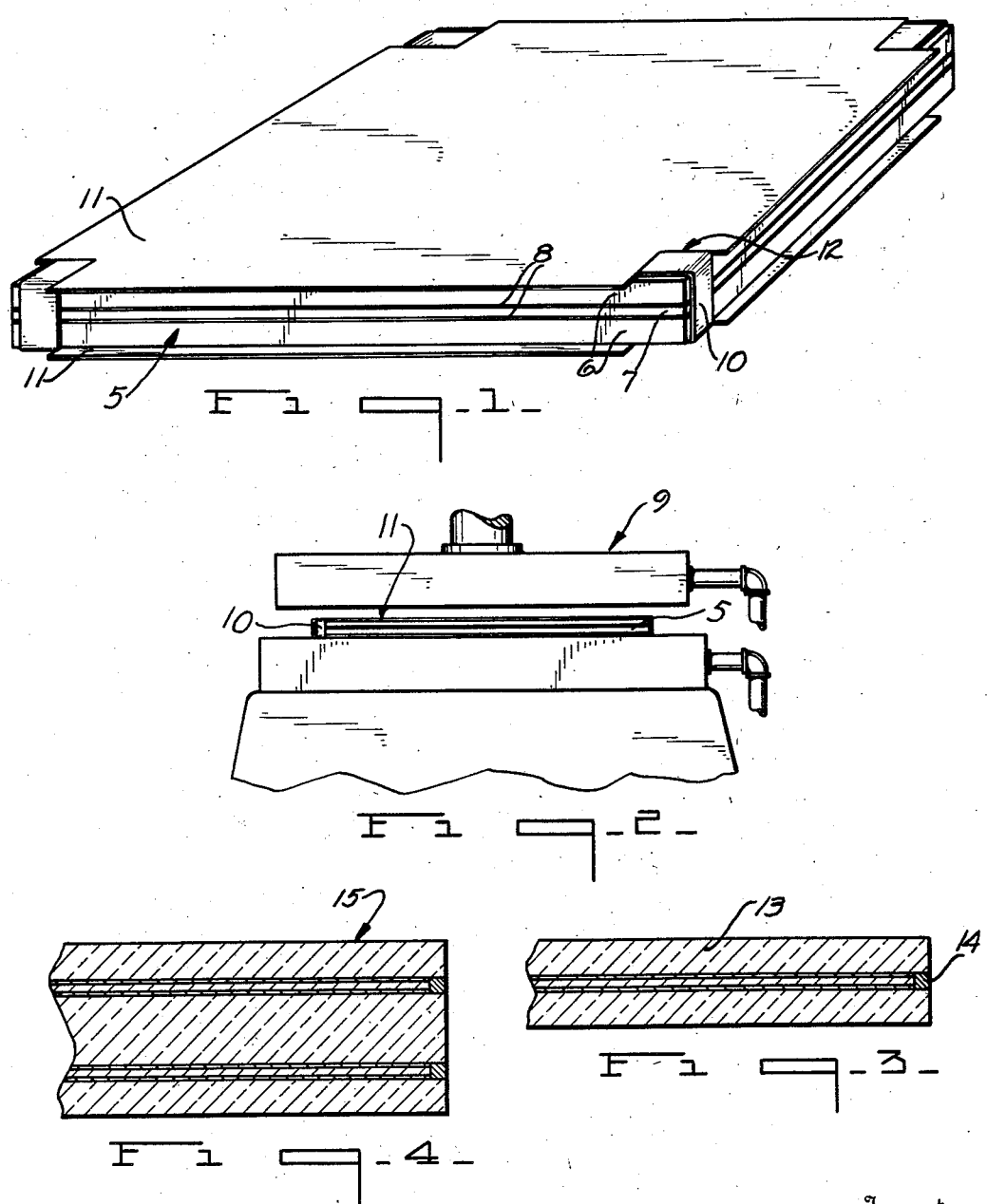
Inventor
George B. Watkins
By Frank Fraser,
Attorney Patented Jan. 19, 1932

1,841,689

UNITED STATES PATENT OFFICE

GEORGE B. WATKINS, OF TOLEDO, OHIO, ASSIGNOR TO LIBBEY-OWENS-FORD GLASS COMPANY, OF TOLEDO, OHIO, A CORPORATION OF OHIO

LAMINATED GLASS AND APPARATUS FOR PRODUCING THE SAME

Application filed May 28, 1928. Serial No. 281,003.

The present invention relates to laminated glass and apparatus for producing the same.

An important object of the invention is to provide means whereby a plurality of laminations can be arranged in proper superimposed relation and then pressed together to form a composite structure, the apparatus including means designed to prevent slippage between the various laminations during the pressing operation.

Another object of the invention is to provide means of such a nature wherein a plurality of laminations are arranged in proper superimposed relation, after which "sticker" means are used to hold the laminations together and to prevent slippage during the pressing operation, and cushion members of substantially the same thickness as the "sticker" means, said cushion members having cut-out portions adapted for the reception of the "sticker" means.

Other objects and advantages of the invention will become more apparent during the course of the following description when taken in connection with the accompanying drawings.

In the drawings wherein like numerals are employed to designate like parts throughout the same, Fig. 1 is a perspective view illustrating my invention in use, Fig. 2 is a diagrammatic representation of a press, and Figs. 3 and 4 are sectional views of finished sheets of laminated glass.

In the production of laminated glass, two or more sheets of glass and one or more sheets of non-brittle material are united to form a composite non-shatterable sheet. There are numerous ways in which laminated glass can be processed, but in practically all of the cases some form of liquid or similar bonding medium is used to obtain the bond between the laminations. It is quite customary to use a sheet of cellulose composition material as the non-brittle membrane or portion of the laminated sheet, and to obtain a bond between it and the glass sheets some form of bonding medium, or cement, is used. Due to the liquid characteristics of the bonding medium, after the laminations have been placed in sandwich form, there is a tendency for the laminations to slip relative to each other.

Referring to Fig. 1, the numeral 5 designates a sandwich composed of two sheets of glass 6 and a sheet of non-brittle material 7 interposed therebetween. Some sort of bonding medium 8 is placed between the glass sheets and the non-brittle sheet. The sandwich 5 is ready to be placed in a press designated in its entirety by the numeral 9. To prevent slippage between the laminations, "stickers" 10 are used. The "stickers" 10 may be of ordinary gummed paper and one "sticker" may be placed at each corner of the sandwich, although obviously any number of "stickers" may be used and they may be placed in any desired positions. Of course, the "sticker" is so applied that it engages both of the outer laminations in the manner illustrated. The term "sticker" is used here and in the claims to mean any device adhering to the outer laminations and placed in a manner to prevent slippage between the laminations.

Although the "stickers" 10 will prevent slippage between the laminations and even though they are relatively thin, I have found that a template 11 is very desirable if a good quality of sheet is to be produced. It will be seen that the "stickers" will make the corners of the sandwich thicker than the rest of the sheet in the absence of the template 11, and therefore if the "stickers" 10 are used and no filler or template provided for the rest of the sheet trouble will be had during the pressing operation in that the pressure will not be evenly exerted over the entire sandwich.

To overcome this difficulty, templates 11 are used, the templates being provided with cut-out portions 12 adapted to receive the "stickers" 10. The templates are formed from a material having the same thickness as the material from which the "stickers" 10 are made so that a uniform pressure can be exerted on the sandwich during the pressing operation. After the "stickers" have been applied to the sandwich and the templates 11 placed in position, the sandwich may be arranged between the platens of the press 9 and there subjected to the combined action of heat and pressure. As the "stickers" 10 prevent slippage between the laminations and as the templates are the same thickness as the "sticker" material, a uniform pressure will be exerted on the sandwich. It will be understood that the term "template" is used to designate any member corresponding to the member illustrated in Fig. 1 and designated by the numeral 11. The template serves a dual function in that it acts as a cushion between the platen and the laminated sandwich and also serves to make uniform the application of pressure to said sandwich.

Figs. 3 and 4 illustrate two different types of finished sheet, the sheet 13 being provided with a seal 14 designed to protect the bond between the laminations. The sheet 15 in Fig. 4 represents a "bullet-proof" type of glass. After the sheet has been formed in the press, the templates 11 may be removed and the "stickers" 10, which have now served their purpose, may be removed by soaking in water or otherwise. Ordinarily it is not desirable to glue the templates 11 to the glass sheets, although of course this may be done if desired. The templates 11 may be formed from felt, cork, paper, or the like, the only requisite being that their thickness be substantially identical with the thickness of the material from which the "stickers" 10 are formed.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing laminated glass, consisting in forming a sandwich from the laminations, applying temporary means to said sandwich to prevent relative movement between the laminations, arranging a "template" on the outer surfaces of the sandwich, said "template" being provided with cut-out portions adapted to receive the temporary means, then pressing the sandwich to produce a finished product, and then removing the temporary means and "templates".

2. The process of producing laminated glass, consisting in forming a sandwich from the laminations, applying "stickers" at the edges of the sandwich to prevent slippage between the laminations, then arranging a "template" over the balance of the area of the sandwich, then pressing the sandwich to produce a finished product, and then removing the temporary means.

3. The process of producing laminated glass, consisting in forming a sandwich from the laminations, applying "stickers" at the edges of the sandwich to prevent slippage between the laminations, then arranging a "template" on the outer surfaces of the sandwich, which "template" is provided with cut-out portions adapted to receive the "stickers", then pressing the sandwich to produce a finished product, and then removing the temporary means.

Signed at Toledo, in the county of Lucas and State of Ohio, this 24th day of May, 1928.

GEORGE B. WATKINS.